(12) United States Patent
Tsuge (10) Patent No.: US 6,542,387 B2
(45) Date of Patent: Apr. 1, 2003

(54) SWITCHING POWER SUPPLY DEVICE (75) Inventor: Makoto Tsuge, Saitama-ken (JP)

(73) Assignee: Sanken Electric Co., Ltd., Saitama-Ken (JP)

( * ) Notice: Subject to any disclaimer, the term of this patent is extended or adjusted under 35 U.S.C. 154(b) by 0 days.

(21) Appl. No.: 09/991,091

(22) Filed: Nov. 16, 2001

(65) Prior Publication Data
US 2002/0186571 A1 Dec. 12, 2002

(30) Foreign Application Priority Data

Jun. 8, 2001 (JP) ......................... 2001-174291

(51) Int. Cl.$^7$ ............................................. H02M 3/335
(52) U.S. Cl. ....................................... 363/21.01; 363/97
(58) Field of Search ........................... 363/20, 21.01, 363/21.12, 21.13, 97, 131

(56) References Cited

U.S. PATENT DOCUMENTS

| 4,849,869 A | * | 7/1989 | Tanuma et al. | 363/21.13 |
|---|---|---|---|---|
| 5,754,414 A | * | 5/1998 | Hanington | 363/21.12 |
| 5,862,045 A | * | 1/1999 | Halamik et al. | 363/97 |
| 5,991,172 A | * | 11/1999 | Jovanovic et al. | 363/21.14 |
| 6,049,471 A | * | 4/2000 | Korcharz et al. | 363/20 |
| 6,118,675 A | * | 9/2000 | Lionetto et al. | 363/21.13 |
| 6,445,598 B1 | * | 9/2002 | Yamada | 363/21.12 |

FOREIGN PATENT DOCUMENTS

| JP | 7-170734 | 7/1995 |
|---|---|---|
| JP | 8-289542 | 11/1996 |
| JP | 2000-184709 | 6/2000 |
| JP | 2000209850 | 7/2000 |
| JP | 2000324823 | 11/2000 |

* cited by examiner

*Primary Examiner*—Adolf Deneke Berhane
(74) *Attorney, Agent, or Firm*—Kilpatrick Stockton LLP (57) ABSTRACT

In a switching power supply device, LATCHs (1–5) count a bottom-number, namely, the number of occurrences of a bottom of a ringing generated, FFs(1–4) store the bottom-number, EXNORs (1–4) and AND(1) compare the previous bottom-number stored in FFs(1–4) with a current bottom-number counted by LATCHs(1–5), and the OFF-period of a switching element (Q1) is maintained until the current bottom-number is reached to the bottom-number of the ringing stored in the FFs (1–4).

3 Claims, 5 Drawing Sheets

SWITCHING POWER SUPPLY DEVICE

CROSS-REFERENCE TO RELATED APPLICATION

This application is based upon and claims the benefit of priority from the prior Japanese Patent Application No.P2001-174291, filed on Jun. 8, 2001; the entire contents of which are incorporated herein by reference.

BACKGROUND OF THE INVENTION

1. Field of the Invention

The present invention relates to a switching power supply device capable of setting the number of ringing to a constant number generated during OFF period of switching elements in order to prevent any generation of magneto striction noise from a transformer.

2. Description of the Related Art

Figure 4:
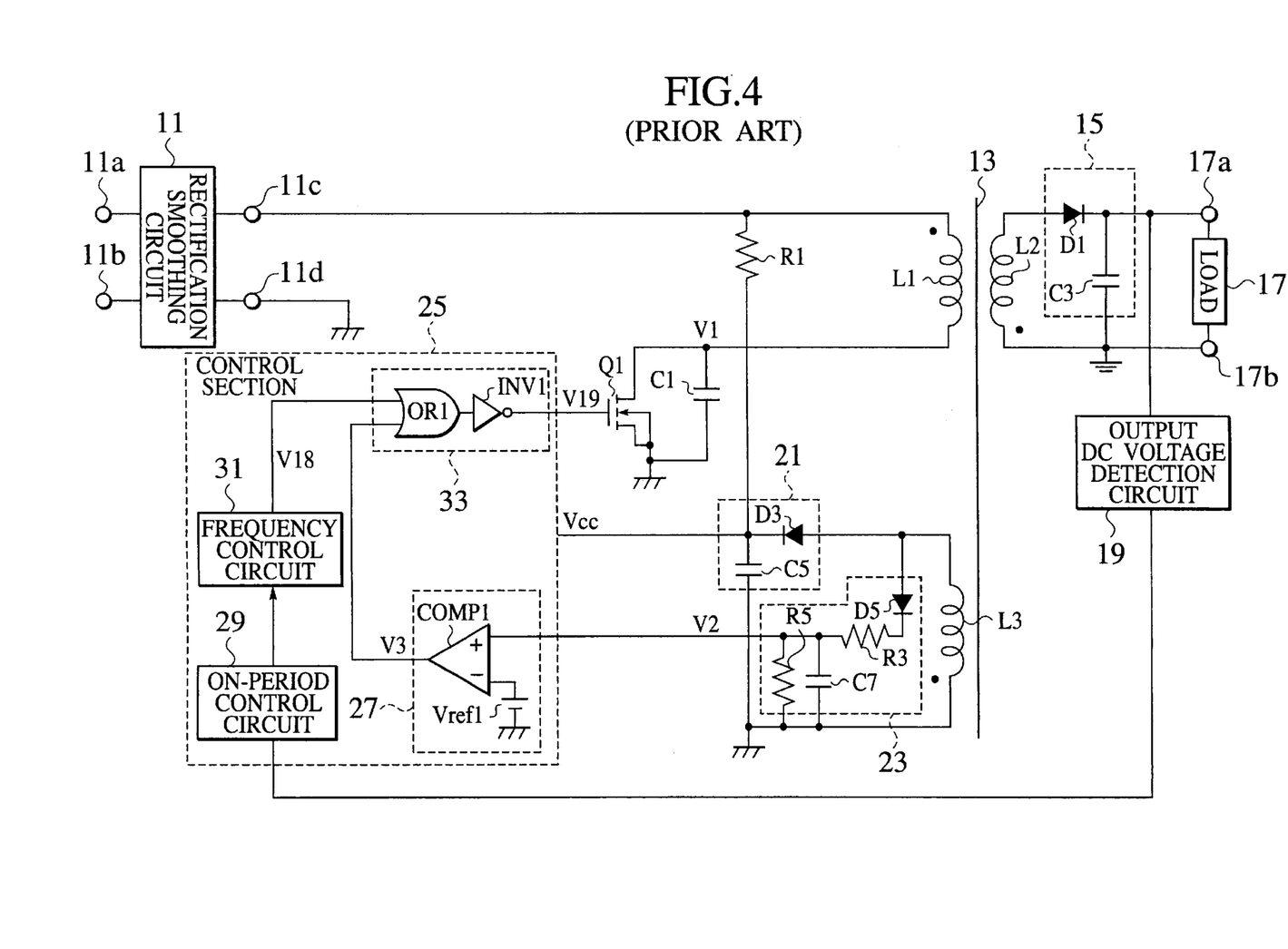
FIG. 4 is a diagram showing a circuit configuration of the conventional switching power supply device.

FIG. 4 is a diagram showing an example of a circuit configuration of a conventional switching power supply device.

In FIG. 4, the rectification smoothing circuit 11 inputs an alternating current (AC) supply voltage, performing a transmission-wave rectification for it through a diode bridge, for example, and smoothing it through a capacitor, and finally outputs a direct current (DC) voltage obtained to a terminal of the primary winding L1 in the transformer 13.

Other terminal of the primary winding L1 of the transformer 13 is connected to the drain of the switching element Q1. The source of the switching element Q1 is connected to the ground that is also connected to the ground portion of the rectification smoothing circuit 11. A capacitor C1 is connected in parallel between the source and the drain of the switching element Q1.

Magnetic energy accumulated in the primary winding L1 of the transformer 13 is sequentially induced in a secondary winding thereof by switching operation of the switching element Q1 controlled by ON-OFF operation of the control section 25 that will be described later. The half-wave rectification is then performed for the magnetic energy induced at the secondary winding by the diode D1 connected to one terminal of the secondary winding L2, and the smoothing is performed by the capacitor C3, and the smoothed DC voltage is then output to the load 17 and also output to the output DC voltage detection circuit 19.

The output DC voltage detection circuit 19 converts the output DC voltage supplied to the load 17 to a feedback signal and outputs it to the ON-period control circuit 29 mounted in the control section 25.

The diode D3 in the output smoothing circuit 21 performs the half-wave performs the half-wave rectification for a flyback voltage generated at an auxiliary winding L3 in the transformer 13 and the capacitor C5 smoothes the voltage obtained from the diode D3. The control section 25 inputs the smoothed voltage Vcc from the capacitor C5.

The control section 25 initiates oscillation when a starting voltage that is over a predetermined voltage is supplied to the starting resistance R1.

When the switching element Q1 is in OFF, ringing is generated at the primary winding L1 in the transformer 13. The resonance frequency f is as follows:

$$f = 1/(2\pi\sqrt{L \times C1}).$$

At the same timing, the ringing is also generated at the auxiliary winding L3.

The ringing generation circuit 23 divides the ringing by the resistances R3 and R5 after the detection through the diode D5. The ringing signal whose high frequency components has been eliminated through the resistance R3 and the capacitor C7 is output to the comparator circuit 27 mounted in the control section 25.

The comparator circuit 27 compares the ringing signal input to the comparator COMP1 with a reference voltage Vref1, and outputs a High-level signal when the ringing signal is larger than the reference voltage Vref1.

The ON-period control circuit 29 generates an ON-period control signal to stabilize the output DC voltage to be supplied to the load 17 by adjusting the ON-period according to the feedback signal from the output DC voltage detection circuit 19 and outputs the generated one to the frequency control circuit 31.

The frequency control circuit 31 oscillates a fixed frequency determined by a capacitor and a time constant of a resistance, for example, while controlling the time length of the ON-period according to the ON-period control signal from the ON-period: control circuit 29 and outputs the control signal to the driving circuit 33.

The inverter INV1 in the driving circuit 33 outputs the driving signal V19 of High level to the switching element Q1 when both the control signal V3 from the comparator circuit 27 to one terminal of the OR gate OR1 and the control signal V18 from the frequency control circuit 31 are in Low level simultaneously.

Next, a description will be given of the explanation of the basic operation of the conventional switching power supply device with reference to the timing chart shown in FIG. 5.

(1) When an AV voltage is supplied to the rectification smoothing circuit 11, the control signal V18 is output to the OR gate OR1 at the timing to when the starting voltage which is over a predetermined voltage is supplied to the terminal Vcc through the starting resistance R1. At this time, because no voltage (V2) is generated in the auxiliary winding L3 in the transformer 13, the comparator circuit 27 outputs the control signal V3 of Low level.

As a result, the switching element Q1 enters ON state when the gate of the switching element Q1 inputs the driving signal V19 of High level from the inverter INV1, and the direct current flows from the terminal 11c of the rectification smoothing circuit 11 to the ground GND through the primary winding L1 of the transformer 13 and the drain and the source of the switching element Q1. During this process, the magneto energy is accumulated into the transformer 13.

(2) At timing ti, the frequency control circuit 31 outputs the control signal V18 of High level to the OR gate OR1.

As a result, the driving signal V19 of High level from the inverter INV1 is switched to Low level, and the driving signal V19 of Low level is transferred to the gate of the switching element Q1. The switching element Q1 is thereby turned OFF and the magneto energy accumulated in the transformer 13 is induced in the secondary winding L2 and the auxiliary winding L3 simultaneously.

(3) At timing t1 to timing t2, the electric energy discharged through the secondary winding L2 in the transformer 13 is rectified by the diode D1 and smoothed by the capacitor C3. The output voltage rectified and smoothed is then supplied to the load.

At this time, a voltage V2 is generated at the auxiliary winding in the transformer 13. Because the input voltage level of the comparator 27 is over the reference voltage Vref1, the comparator 27 outputs the output voltage V3 of High level.

(4) Immediately before the timing t2, the level of the input voltage V2 from the comparator 27 is gradually decreased.

Figure 5:
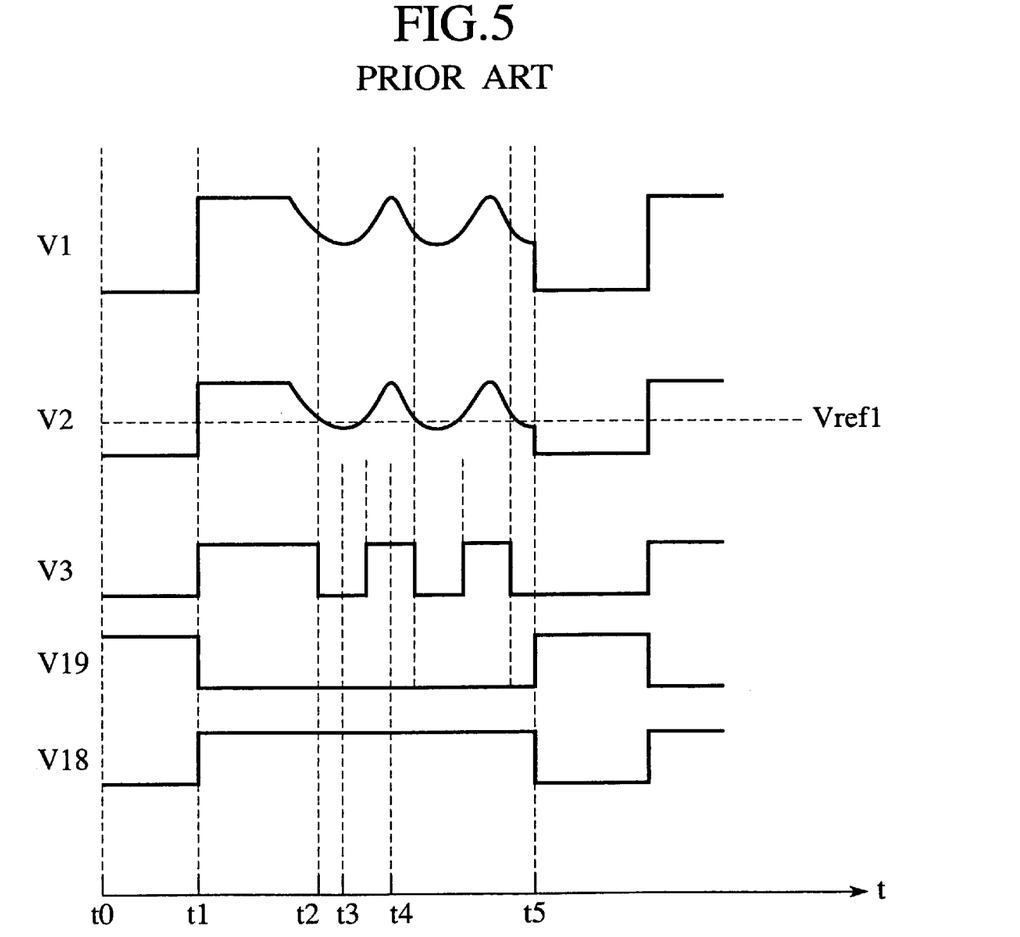
FIG. 5 is a timing chart showing the operation of the conventional switching power supply device.

As shown in FIG. 5, the voltage V2 of the auxiliary winding L3 is reached to a bottom level (B) at timing t3 and then increased after the timing t3 and reached to a high level at timing t4 and decreased after timing t4 again. This phenomenon is called to as "ringing". The same ringing phenomenon is also generated in the voltage V1 of the primary winding L1.

(5) At timing t4 to timing t5, the ringing phenomenon that has been explained in the section (4) is occurred one time. Because the conventional switching power supply device operates by a fixed frequency, the control signal V18 of Low level is transferred to the OR gate OR1 at timing t5.

At this time, because both the input terminals of the OR gate OR1 input the signals V18 and V3 of Low level when the level of the voltage V2 is decreased by the ringing phenomenon caused in the auxiliary winding L3 in the transformer 13 and the level of the output voltage V3 of the comparator circuit 27 becomes Low level, the gate of the switching element Q1 inputs the driving signal V19 of High level from the inverter INV1. Thereby the switching element Q1 is turned ON.

Thus, in the conventional switching power supply device, the control voltage V2 caused by the ringing phenomenon in the auxiliary winding L3 in the transformer 13 is turned OFF around the bottom level that is not more than the reference voltage Vref1.

As described above, because the conventional switching power supply device operates by a fixed oscillation frequency, the switching element Q1 is turned OFF when the voltage V2 caused by the ringing phenomenon is around the bottom level that is not more than the reference voltage Vref1.

By the way, when both the control signal V3 to be supplied to the OR gate OR1 from the comparator circuit 27 and the control signal V18 from the frequency control circuit 31 in the driving circuit 33 become Low level simultaneously, the inverter INV1 outputs the driving signal V19 of High level to the switching element Q1. Accordingly, when the timing to be switched to Low level in one of the control signal V3 from the comparator circuit 27 and the control signal V18 from the frequency control circuit 31 is delayed, the timing at which the switching element Q1 is turned ON is delayed from the timing determined by the fixed oscillation frequency.

As a result, following two cases happen: The number of occurrences of the ringing becomes N and N+1 during the OFF-period of the switching element Q1 under the condition of the same load and the same input voltage.

There is a drawback that the OFF-period of the switching element Q1 is changed by one ringing period and the magneto striction noise occurs in the transformer according to the change of the OFF-period.

SUMMARY OF THE INVENTION

Accordingly, an object of the present invention is, with due consideration to the drawbacks of the conventional technique, to provide a switching power supply device capable of preventing any magneto striction noise from a transformer.

Briefly, the present invention may be summarized as a switching power supply device capable of preventing occurrence of a magneto striction noise. The switching power supply device comprises a switching element connected to a primary winding of a transformer connected in series to a direct current (DC) power supply,, a rectification smoothing circuit for rectifying and smoothing an alternating current (AC) voltage induced in a secondary winding of the transformer, an output voltage detection circuit for detecting an output voltage rectified and smoothed by the rectification smoothing circuit and outputs a voltage detection signal to a primary circuit of the transformer, a control circuit for controlling ON-period of the switching element in order to stabilize the output voltage based on the voltage detection signal from the output voltage detection circuit, and a bottom detection circuit for detecting a bottom of a ringing in a same timing of the generation of the ringing between the capacitor connected in parallel to the switching element and the transformer during OFF-period of the switching element. In the switching power supply device of the present invention, a bottom-number count circuit for counting the number of occurrences of the bottom of the ringing, as a bottom-number, detected by the bottom detection circuit, a bottom-number storage circuit for storing the bottom-number counted by the bottom-number count circuit, a bottom-number comparison circuit for comparing the bottom-number stored in the bottom-number storage circuit with a current bottom-number in order to check whether both are equal, and an OFF-period control circuit for maintaining the OFF-period of the switching element until the current bottom-number is reached to the bottom-number stored in the bottom-number storage circuit according to the comparison result from the bottom-number comparison circuit.

According to the present invention, the switching power supply device further comprises a reset circuit for resetting the bottom-number stored in the bottom-number storage circuit.

In the switching power supply device described above, the reset circuit resets the bottom-number stored in the bottom-number storage circuit in a case where the bottom-number of the ringing counted by the bottom-number count circuit is on the increase or on the decrease.

The above and other features and advantages of this invention and the manner of realizing them will become more apparent, and the invention itself will best be understood, from a study of the following description and attached claims, with reference had to the attached drawings showing some preferable embodiments of the invention.

DESCRIPTION OF THE PREFERRED EMBODIMENTS

Other features of this invention will become apparent through the following description of preferred embodiments which are given for illustration of the invention and are not intended to be limiting thereof.

First embodiment

Figure 1:
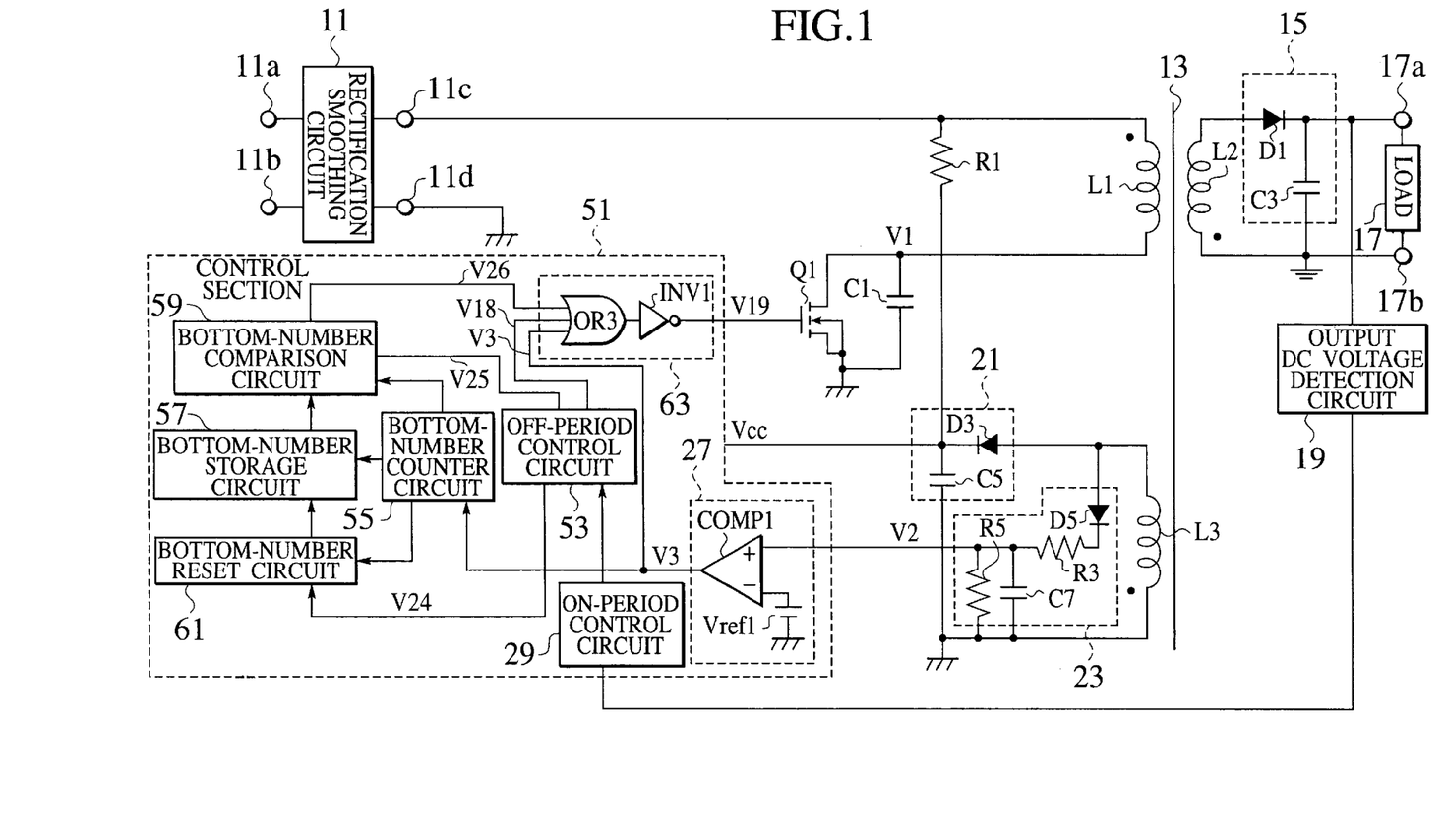
FIG. 1 is a diagram showing a configuration of the switching power supply device according to the first embodiment of the present invention.

FIG. 1 is a diagram showing a configuration of the switching power supply device according to the first embodiment of the present invention. The switching power supply device of the first embodiment according to the present invention basically has the same configuration of the conventional one shown in FIG. 4. The same components therefore are referred to the same reference numbers and characters, and the explanation for them is omitted here for brevity.

The feature of the switching power supply device of the first embodiment is that the control section 51 comprises the OFF-period control circuit 53, the bottom-number counter circuit 55, the bottom-number storage circuit 57, the bottom-number comparison circuit 59, the bottom-number reset circuit 61, and the driving circuit 63. The OFF-period control circuit 53 controls the OFF-period of the switching element Q1 based on PMW control. The bottom-number counter circuit 55 counts the number of occurrences of the bottom of the ringing signal, namely, a bottom-number, generated by the comparator circuit 27. The bottom-number storage circuit 57 stores the number of occurrences of the bottom (namely, the bottom-number) of the ringing signal counted by the bottom-number counter circuit 55. The bottom-number comparison circuit 59 compares the number of occurrences of the bottom of the ringing signal counted by the bottom-number counter circuit 55 with the bottom number stored in the bottom-number storage circuit 57. The bottom-number reset circuit 61 resets the bottom-number stored in the bottom-number storage circuit 57. The driving circuit 63 drives the switching element Q1.

Figure 2:
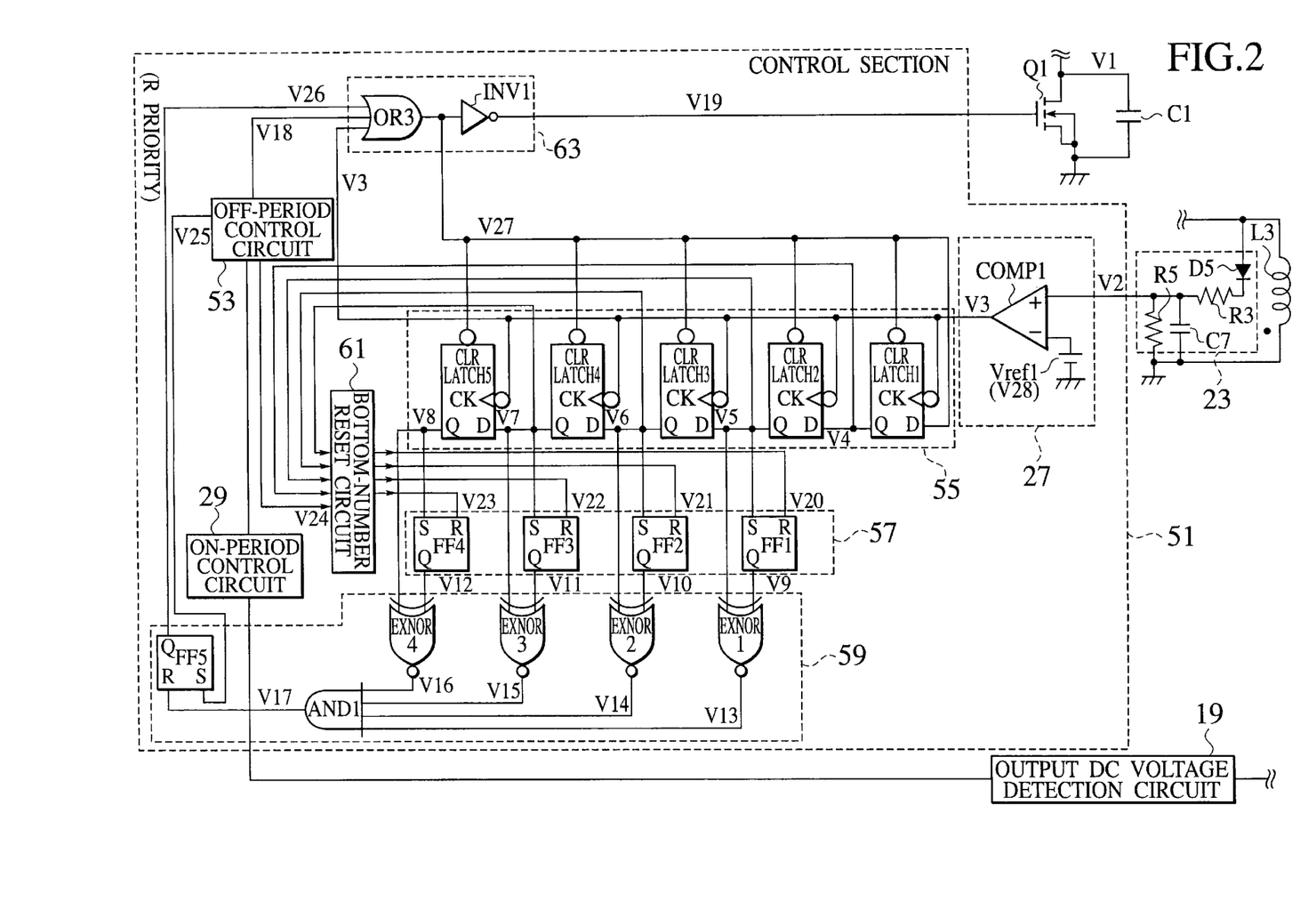
FIG. 2 is a diagram showing a detailed configuration of the control section 51 in the switching power supply device of the first embodiment of the present invention.

FIG. 2 is a diagram showing a detailed configuration of the control section 51 in the switching power supply device of the first embodiment of the present invention.

The ON-period control circuit 29 that has received the feedback signal transferred from the output DC voltage detection circuit 19 performs to stabilize the output voltage at the secondary winding of the transformer 13 by adjusting the ON-period of the switching element Q1.

The OFF-period control circuit 53 generates a pulse signal after a fixed time is elapsed counted from the entering of the ON state of the switching element Q1 (the rising edge of the control signal V19). The OFF-period control circuit 53 also generates the control signals V24 and V25, the down edge of the control signal V18, a pulse signal (that is necessary when the number of occurrences of the bottom of the ringing signal is changed from two to one) after the down edge of the control signal V18.

The control signal supplied from the ON-period control circuit 29 to the OFF-period control circuit 53 is a signal to set the switching element Q1 into OFF-state (to halt ON-state). The OFF-period: control circuit 53 generates the control signal V24 during the period from the generation of the pulse signal of the control signal V25 and the down edge of the control signal V18, and outputs the control signal V24 generated to the bottom-number-reset circuit 61.

The bottom-number counter circuit 55 is made up of latch circuits LATCH1 to LATCH5 and inputs the down edge of the ringing signal V3 generated at the comparator circuit 27 as a clock signal and inputs the control signal V27 as both a clear signal and a data signal. The latch circuits LATCH1 to LATCH5 are cleared when receiving the control signal V27 of Low level transferred from the OR gate OR3 and count the number of occurrences of the bottom (B) of the ringing signal when receiving the control signal V27 of High level.

The bottom-number storage circuit 57 comprises RS flip flops designated by reference characters FF1 to FF4 and stores the number of occurrences of the bottom of the ringing signal by setting the FF1 to FF4 to High level by receiving the corresponding control signals V5 to V8 of H level transferred from the latch circuits LATCH2 to LATCH5, respectively. Further, the information, namely, the bottom-number, stored in the bottom-number storage circuit 57 can be reset by receiving the reset signals V20 to V23 supplied from the bottom-number reset circuit 61.

The bottom-number comparison circuit 59 comprises EXNOR gates EXNOR1 to EXNOR 4 and an AND gate AND1. The bottom-number comparison circuit 59 compares the previous bottom-number with the current bottom-number, (namely, it compares the number of occurrences of the bottom of the ringing signal stored in the flip flops FF1 to FF4, that has occurred in the previous OFF-period, with the control signals V5 to V8 indicating the number of occurrences of that counted by the latch circuits LATCH2 to LATCH5 during the current OFF-period.

When both bottom-numbers are agreed, the AND gate AND1 in the bottom-number comparison circuit 59 outputs the control signal V17 of High level, indicating that the current bottom-number is just reached to the previous bottom-number, to the reset terminal of each of the flip flops FF1 to FF5.

The flip flop FF5 is set by receiving the control signal V25, indicating the initiation to maintain the OFF-period, transferred from the OFF-period control circuit 53, and reset by receiving the control signal V17, transferred from the AND gate AND1, indicating that the current bottom-number has been reached to the previous bottom-number. When reset, the flip flop FF5 outputs the control signal V26 to the OR gate OR3.

The bottom-number reset circuit 61 generates the reset signals V20 to V23 in order to reset the corresponding bit indicating the bottom-number stored in the flip flops FF1 to FF4 based on the control signals V4 to V7 transferred from the latch circuits LATCH1 to LATCH4 and the control signal V24 transferred form the OFF-period control circuit 53. That is, the OFF-period control circuit 53 generates the control signal V24 during the generated pulse signal of the control signal V25 to the down edge of the control signal V18. The bottom-number reset circuit 61 generates the reset pulse control signal V22 because it does not receive at least one of the control signals V4 to V7 corresponding to occurrence of the bottom of the ringing signal at the generation of the control signal V24 when at least one of the control signals V4 to V7 transferred from the latch circuits LATCH1 to LATCH4 is in Low level at the generation of the control signal V24. As a result, it is thereby possible to set the switching element Q1 into the ON-state when the number of occurrences of the bottom of the ringing signal is three, not four.

The driving circuit 63 comprises the OR gate OR3 and the inverter INV1. The OR gate OR3 outputs the reset signal of Low level to the latch circuits LATCH1 to LATCH5 and the inverter INV1 outputs the driving signal V19 to the switching element Q1 during the timing that the following conditions occur simultaneously:

When the comparator circuit 27 generates and outputs the control signal V3 of Low level;

When the OFF-period control circuit 53 outputs the control signal V18 of Low level; and When the flip flop FF5 outputs the reset signal V27 of Low level.

Figure 3:
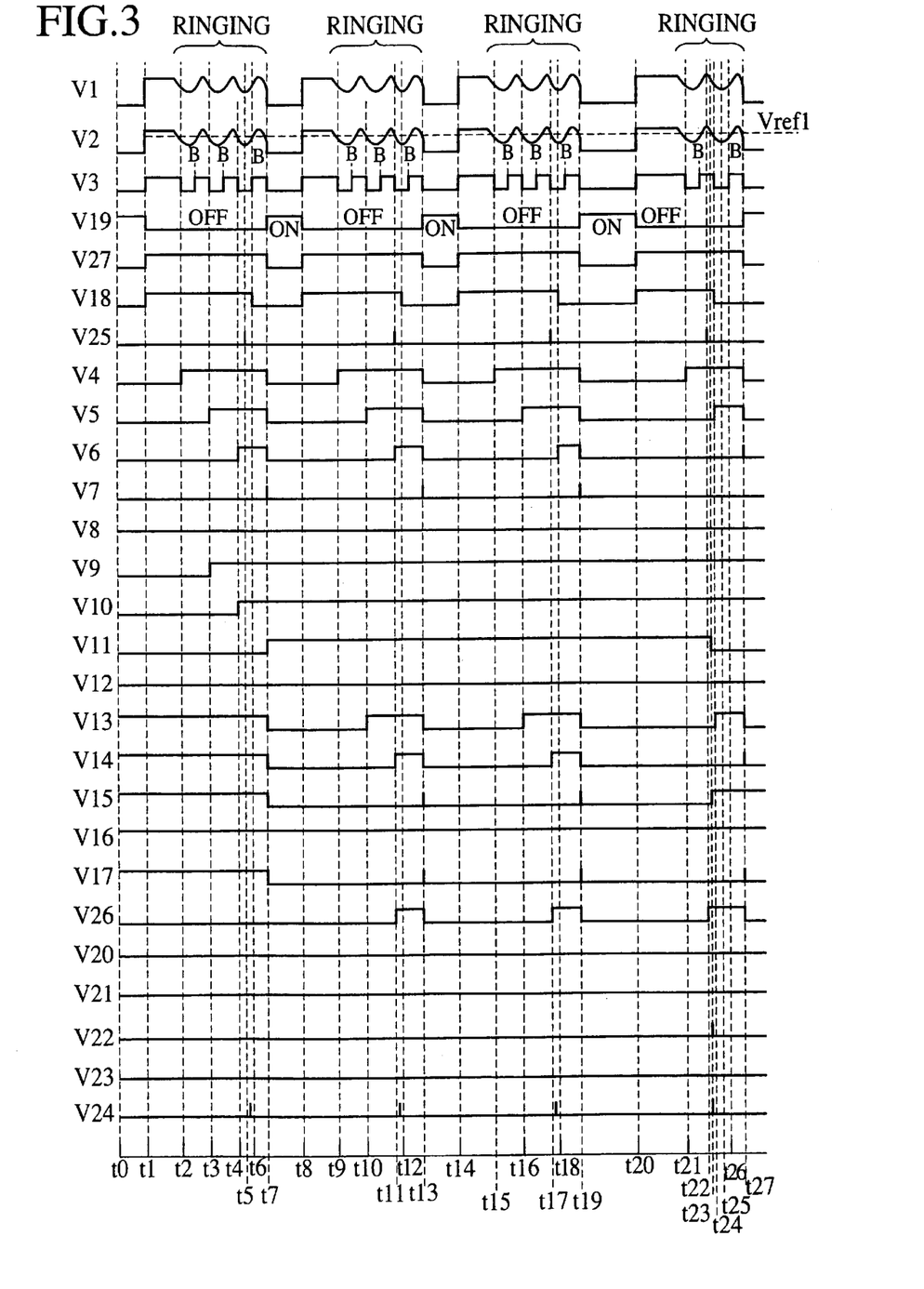
FIG. 3 is a timing chart showing the operation of the switching power supply device according to the first embodiment of the present invention.

Next, a description will be given of the operation of the switching power supply device with reference to FIG. 2 and FIG. 3 where FIG. 2 shows the detailed configuration of the control section 51 and FIG. 3 shows the timing chart of the main section of the control section 51.

(1) Example of the Operation of the Switching Power Supply Device During Timing t0 to Timing t13.

At timing t0 shown in FIG. 3, the inverter INV1 in the driving circuit 63 outputs the driving signal V19 of High level, and the switching element Q1 is thereby turned ON. As a result, the driving signal V19 of High level transferred from the inverter INV1 sets the switching element Q1 into ON state, and the DC current flows from the terminal 11c in the rectification smoothing circuit 11 to the ground GND through the primary winding L1 of the transformer 13 and the drain-source of the switching element Q1. The magneto energy is accumulated in the transformer 13 during the timing t0 to the timing t1.

Here, when receiving the feedback signal from the output DC voltage detection circuit 19, the ON-period control circuit 29 adjusts the time length of the ON-period in order to generate the ON-period control signal for stabilizing the output DC voltage to be supplied to the load 17, and then outputs the ON-period control signal generated to the OFF-period control circuit 53. When receiving the ON-period control signal transferred from the ON-period control circuit 29, the OFF-period control circuit 53 generates the control signal V18 of High level and outputs the generated one to the OR gate OR3. Thereby, the ON-period of the switching element Q1 is completed at the timing t1.

During the timing t1 to the timing t2, the electric energy discharged through the secondary winding L2 in the transformer 13 is rectified and smoothed by the diode D1 and the capacitor C3 and the output voltage is thereby supplied to the load.

At this time, the voltage V2 is generated at the auxiliary winding L3 in the transformer 13. Because the voltage V2 is over the reference voltage Vref1, namely, the comparator circuit 27 inputs the control signal of this voltage V2, the comparator circuit 27 outputs the control signal V3 of High level.

During the timings t1 to t6 after the timings t1 to t2, the OFF-period of the switching element Q1 is kept by receiving the control signal V19 from the driving circuit 63 based on the control signal V18 generated from the OFF-period control circuit 53.

The level of the control signal V2 transferred from the ringing generation circuit 23, namely the level of the input voltage V2 to be supplied to the comparator circuit 27, is gradually decreased immediately before the timing t2. In this case, the ringing phenomenon occurs where the level of the voltage V2 at the auxiliary winding L3 is reached to the level of the bottom (designated by reference character "B", see FIG. 3), then increased to the peak level after the bottom level (B), and then also decreased, repeatedly. It can be observed to occur the same ringing phenomenon in the voltage V1 generated in the primary winding L1.

Next, the comparator circuit 27 inputs the control signal V2 and the reference voltage V28. This control signal V2 is generated and transferred from the ringing generation circuit 23 at the same timing to input the control signal V1 supplied to the switching element Q1 in OFF-state at the timing t6. Thereby, the switching element Q1 is in OFF-state during the timings t6 to t7, that is, it can be maintained that the switching element Q1 Is in OFF-state during the timings t1 to t7.

In the OFF-period during the timings t1 to t7, the OR gate OR3 in the driving circuit 63 inputs the control signal V3 generated at the comparator circuit 27 and outputs the control signal V27 to the latch circuit LATCH1, and the latch circuit LATCH1 to LATCH5 input the control signal V3 from the comparator circuit 27. Thereby, the latch circuits LATCH1 to LATCH 5 generate and output the control signals V4 to V8, respectively.

That is, the latch circuits LATCH1 to LATCH5 count the number of down edges of the control signal V3 during the timings t1 to t7. The details are as follows: As shown in FIG. 3, the control signals V4, V5, V6, and V7 of High level are counted at the timings t2, t3, t4, and t7, respectively. Further, the flip flops FF1 to FF4 input the control signals V5 to V8 as the control signal V9 to V12 indicating the number of occurrences of the bottom of the ringing signal generated during the previous OFF-period.

Here, the EXNOR gate EXNOR1 compares the control signal V5 with the control signal V9, the EXNOR gate EXNOR2 compares the control signal V6 with the control signal V10, the EXNOR gate EXNOR3 compares the control signal V7 with the control signal V11, and the EXNOR gate EXNOR4 compares the control signal V8 with the control signal V12. They output the comparison results V13 to V16 to the AND gate AND1.

During, the timings t1 to t7, the EXNOR gates EXNOR1 to EXNOR 4 input the control signals V5 and V9, V6 and V10, V7 and V11, and V8 and V12 of the same level, respectively. That is, because all of the input terminals in the AND gate AND1 input the control signals of High level, the AND gate AND1 outputs the control signal V17 of High level. As a result, during the timings t1 to t7, the flip flop FF5 outputs the control signal V26 of Low level because the flip flop FF5 inputs the reset signal of the highest priority in operation.

At the timing t5 where the OFF-period control circuit 53 outputs the control signal V18 of High level, the OFF-period control circuit 53 outputs the control signal V25 initiating to maintain the OFF-period of the switching element Q1 to the set terminal S of the flip flop FF5.

Because the OR gate OR3 inputs the control signals V26, V18, and V3 of Low level simultaneously at the timing t7, the switching element Q1 is turned ON. At this time, because the clear terminal CLR of each of the latch circuits LATCH1 to LATCH5 inputs the control signal V27 transferred from the OR gate OR3, the control signals V4 to V8 are cleared, namely, switched from High level to Low level.

Like the same manner described above, the ON-period of the switching element Q1 is completed by the ON-period control circuit 29 at the timing t8 and the control signal V18 transferred from the OFF-period control circuit 53 becomes High level, the OFF-period of the switching element Q1 is kept during the timings t8 to t12.

During the timings t8 to t12, the latch circuits LATCH1 to LATCH5 count the number of the down edges of the control signal V3 generated by the comparator circuit 27 and output the control signals V4 to V8.

At the timing t11, because the terminal S of the flip flop 55 inputs the control signal V25 of High level indicating the initiation of the OFF-period transferred from the OFF-period control circuit 53, Q output from the flip flop FF5 is switched from Low level to High level.

At this time, because the control signal V7 is different in level from that of the control signal V11, the EXNOR gate EXNOR3 outputs the control signal V15 to the AND gate AND1, and the level of the control signal V17 from the AND gate AND1 is switched to Low level. Accordingly, the switching element Q1 is kept in OFF-state after the timing t12. On the contrary, the switching element Q1 in the conventional switching power supply device shown in FIG. 4 is turned ON at the timing t12.

At the timing t13, both the control signals V7 and V11 become the same level simultaneously by the down edge of the control signal V3 generated by the comparator circuit 27, and the control signal V17 indicating that the current bottom-number has been reached to the previous bottom-number output from the AND gate AND1 becomes High level, and the Q output (that Is, the control signal V26) of the flip flop FF5 Is switched from High level to Low level.

That is, the AND gate AND1 outputs to the reset terminal of the flip flop FF5 the control signal V17 of High level indicating that the current bottom-number has been reached to the previous bottom-number by agreeing the bottom-number of the ringing generated during the previous OFF-period stored in the flip flops FF1 to FF4 with the bottom-number of the ringing during the current OFF-period counted by the latch circuits LATCH1 to LATCH4.

The OFF-period control circuit 53 has generated the pulse signal of the control signal V24 during the time length from the pulse signal of the generated control signal V25 to the down edge of the control signal V18, and the bottom-number reset signal 61 generates no reset pulse control signal V22 because second bottom occurs at the generation of the control signal V24 when the control signal V5 from the latch circuit LATCH2 is High level at the generation of the control signal V24, for example. As a result, it is possible to set to ON-state the switching element Q1 at the occurrence of the fourth bottom, like the previous process where the fourth occurrence of the bottom sets the switching element Q1 into the ON-state.

At the timing t13, the switching element Q1 is thereby turned ON. After this, the same operation is performed during the timings t13 to t22.

Thus, the latch circuits LATCH1 to LATCH5 count the bottom-number of the ringing and the flip flops FF1 to FF4 store the bottom-number of the ringing counted, and the EXNOR gates EXNOR1 to EXNOR4 and the AND gate AND1 compare the previous bottom-number stored in the flip flops FF1 to FF4 with the current bottom-number counted by the latch circuits LATCH1 to LATCH5, and the OFF-period of the switching element Q1 is maintained until both bottom-numbers become equal. It Is thereby possible to set the number of occurrences of the ringing to a same number. This can prevent the generation of the magneto striction noise from the transformer.

As a result, even if the same load and the same input voltage are used, it is possible to set the number of occurrences of the ringing to the same number and to eliminate the case where the number of occurrences of the ringing is changed, for example, N times and N+1 times, like the conventional one, and to eliminate any occurrence to change the time length of the OFF-period of the switching element Q1 caused by one ringing time-period. It is thereby possible to eliminate the conventional drawback to generate the magneto striction noise from the transformer.

(2) Example of Operation of the Switching Power Supply Device During the Timings t17 to t18

Next, the bottom-number reset circuit 61 does not output the control signal V22 of High level to the reset terminal R of the flip flop FF3 based on the control signal V24 from the OFF-period control circuit 53 and the Q output from the latch circuits LATCH1 to LATCH4. Thereby, the flip flop FF3 outputs the Q output of High level.

That is, the OFF-period control circuit 53 has generated the pulse signal of the control signal V24 during the receiving of the generated control signal V25 to the down edge of the control signal V18, and the bottom-number reset circuit 61 does not generate the reset pulse of the control signal V21 because the second bottom occurs at the generation of the control signal V24 when the control signal V5 from the latch circuit LATCH2 is High level at the generation of the control signal V24. As a result, it is possible to enter the switching element Q1 to ON-state at the occurrence of the fourth bottom of the ringing signal, just like the previous process where the switching element Q1 is also turned ON by the occurrence of the fourth bottom of the ringing signal.

At the timing t19, because the control signals V5 and V9 supplied to the EXNOR gate EXNOR1, the control signals V6 and V15 supplied to the EXNOR gate EXNOR2, the control signals V7 and V10 supplied to the EXNOR gate EXNOR3, and the control signals V8 and V12 supplied to the EXNOR gate EXNOR4 become a same level, the AND gate AND1 outputs the control signal V17 of High level, which indicates that the current bottom-number has been reached to the previous bottom-number, to the reset terminal R of the flip flop FF5, and the flip flop FF5 outputs the Q output of Low level, and the switching element is thereby turned ON.

(3) Example of the Operation of the Switching Element Q1 During the Timings t23 to t27

Next, at the timing t23, the bottom-number reset circuit 61 outputs the control signal V22 of High level to the reset terminal R of the flip flop FF3 based on the control signal V24 from the OFF-period control circuit 53 and the Q output from the LATCH circuits LATCH1 to LATCH4, and the flip flop FF3 thereby outputs the Q output of Low level.

That is, the OFF-period control circuit 53 generates the control signal V24 during the time period from the generation of the control signal V25 to the down edge of the control signal V18, and the bottom-number reset circuit 61 generates the reset pulse control signal V22 because the second bottom does not occur at the generation of the control signal V24 when the control signal V5 from the latch circuit LATCH2 is Low level at the generation of the control signal V24. As a result, it is possible to enter the switching element Q1 into ON-state by receiving the third bottom of the ringing signal, on the contrary, in the previous process, the receiving of the fourth bottom of the ringing signal causes to enter the switching element Q1 into ON-state.

At the timing t27, because the control signals V5 and V9 supplied to the EXNOR gate EXNOR1, the control signals V6 and V10 supplied to the EXNOR gate EXNOR2, the control signals V7 and V11 supplied to the EXNOR gate EXNOR3, and the control signals V8 and V12 supplied to the EXNOR gate EXNOR4 become a same level, the AND gate AND1 outputs the control signal V17 of High level, which indicates that the current bottom-number has been reached to the previous bottom-number, to the reset terminal R of the flip flop FF5, and the flip flop FF5 outputs the Q output of Low level, and the switching element is thereby turned ON.

(4) Example of Operation of the Switching Power Supply Device During Other Timings The bottom-number reset circuit 61 outputs the reset pulse signal V21 when the control signal V24 is Low level at the generation of the control signal V24. This causes to set the switching element Q1 into ON-state by receiving the second bottom of the ringing signal, on the contrary, the receiving of the third-bottom causes to enter it into the ON-state in the previous process.

In addition, the bottom-number reset circuit 61 generates the reset pulse control signal V23 when the control signal V6 is Low level at the generation of the control signal V24. This causes to set the switching element Q1 into ON-state by receiving the fourth bottom of the ringing signal, on the contrary, the receiving of the fifth-bottom causes to enter it into the ON-state in the previous process.

Furthermore, the bottom-number reset circuit 61 generates the control signal V24 (base pulse signal) after the receiving of the down edge of the control signal V18, and outputs the reset pulse signal V20 when the control signal V4 is Low level at the generation of this control signal V24. This causes to set the switching element Q1 into ON-state by receiving the first bottom of the ringing signal, on the contrary, the receiving of the second-bottom causes to enter it into the ON-state in the previous process.

For example, there is a case that the switching element Q1 enters ON-state by receiving the second bottom of the ringing signal, not the third bottom, following the case where it enters to ON-state by receiving the fourth bottom according to the input/output conditions of the switching power supply device.

As the manners (2) to (4) described above, the OFF-period control circuit 53 generates the control signal V24 during the receiving of the control signal V25 to the down edge of the control signal V18, and the bottom-number reset circuit 61 generates the reset pulse signal V2 because the second bottom of the ringing signal occurs at the generation of the control signal V24 when the control signal V5 from the latch circuit LATCH2 is Low level at the generation of the control signal V24.

As a result, it is possible to enter the switching element Q1 into ON-state at the occurrence of the (N−1)th bottom even if it is turned ON at the N-th bottom in the previous process.

That is, even if the occurrences of the bottom-number of the ringing signal is on the decrease, it is possible to set the number of occurrences of the ringing generated during the OFF-period of the switching element Q1 to a constant number and thereby to prevent any generation of the magneto striation noise in the transformer.

In the procedures (2) to (4) described above, it has been explained that the switching element Q1 is turned ON by the occurrence of the (N−1)th bottom when it is turned ON by the occurrence of the N-th bottom in the previous process under the condition where the occurrences of the bottom-number of the ringing signal is on the decrease. However, the concept of the present invention is not limited by this manner, that is, the present invention can be applied to the condition where the occurrence of the bottom-number of the ringing signal is on increase. For example, the switching element Q1 can be turned ON by the occurrence of the (N+1)th bottom when it is turned ON by the occurrence of the N-th bottom in the previous process under the condition where the occurrences of the bottom-number of the ringing signal is on the decrease, and it Is possible to set the number of occurrences of the ringing signal generated during the OFF-period of the switching element Q1 to a constant number and thereby to prevent any generation of the magneto striction noise in the transformer.

Example of Other Embodiments

The embodiment described above has the configuration where the latch circuits LATCH1 to LATCH5 equivalently count the number of occurrences of the bottom of the ringing signal, generated in the drain-source of the switching element Q1 during the OFF-period of the switching element Q1, until five times. However, the present invention is not limited by this configuration, for example, it is possible to count the number of occurrences of the bottom-number of the ringing signal more than five-times by mounting one or more additional latch circuits.

Furthermore, although the OFF-period control circuit 53 performs the PWM control in the prescribed embodiment, the present invention can be applied to the OFF-period control circuit having a fixed OFF-period if the switching power supply device is so designed that the OFF-period can be extended.

As set forth, according to the present invention, the bottom-number of the ringing signal generated in the transformer during the OFF-period of the switching element is stored, and the previous bottom-number stored is compared with the current bottom-number whether or not both are equal, and it is so controlled that the OFF-period of the switching element is maintained until the current bottom-number becomes equal to the previous bottom-number store in order to set the number of occurrences of the ringing to a constant number. It is therefore possible to prevent any occurrence of the magneto striction noise in the transformer.

All these and other modifications and alterations of the illustrated embodiments within the common knowledge of the specialists are intended in the foregoing disclosure. It is therefore appropriate that the invention be construed broadly and in a manner consistent with the fair meaning or proper scope of the subjoined claims.

What is claimed is:

1. A switching power supply device comprising:

a switching element connected in series to a primary winding of a transformer connected to a direct current (DC) power supply:

a rectification smoothing circuit for rectifying and smoothing an alternating current (AC) voltage induced in a secondary winding of the transformer;

an output voltage detection circuit for detecting an output voltage rectified and smoothed by the rectification smoothing circuit and outputs a voltage detection signal to a primary circuit of the transformer;

a control circuit for controlling ON-period of the switching element in order to stabilize the output voltage based on the voltage detection signal from the output voltage detection circuit; and a bottom detection circuit for detecting a bottom of a ringing in a same timing of the generation of the ringing between the capacitor connected in parallel to the switching element and the transformer during OFF-period of the switching element, wherein the control circuit comprises:

a bottom-number count circuit for counting the number of occurrences of the bottom of the ringing, as a bottom-number, detected by the bottom detection circuit;

a bottom-number storage circuit for storing the bottom-number counted by the bottom-number count circuit;

a bottom-number comparison circuit for comparing the bottom-number stored in the bottom-number storage circuit with a current bottom-number in order to check whether both are equal; and an OFF-period control circuit for maintaining the OFF-period of the switching element until the current bottom-number is reached to the bottom-number stored in the bottom-number storage circuit according to the comparison result from the bottom-number comparison circuit.

2. The switching power supply device according to claim 1, further comprises a reset circuit for resetting the bottom-number stored in the bottom-number storage circuit.

3. The switching power supply device according to claim 2, wherein the reset circuit resets the bottom-number stored in the bottom-number storage circuit in a case where the bottom-number of the ringing counted by the bottom-number count circuit is on the increase or on the decrease.

* * * * *